United States Patent
Kondo et al.

(10) Patent No.: US 12,123,520 B2
(45) Date of Patent: Oct. 22, 2024

(54) DIAPHRAGM, VALVE DEVICE, AND METHOD FOR MANUFACTURING DIAPHRAGM

(71) Applicant: FUJIKIN INCORPORATED, Osaka (JP)

(72) Inventors: Kenta Kondo, Osaka (JP); Toshiyuki Inada, Osaka (JP); Tomohiro Nakata, Osaka (JP); Kazunari Watanabe, Osaka (JP); Tomoki Nakada, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 67 days.

(21) Appl. No.: 17/510,805

(22) Filed: Oct. 26, 2021

(65) Prior Publication Data

US 2022/0049775 A1    Feb. 17, 2022

Related U.S. Application Data

(63) Continuation of application No. PCT/JP2020/015584, filed on Apr. 6, 2020.

(30) Foreign Application Priority Data

Apr. 26, 2019 (JP) ................. 2019-086334

(51) Int. Cl.
*F16K 7/12*     (2006.01)
*F16K 31/122*   (2006.01)

(52) U.S. Cl.
CPC .......... *F16K 7/126* (2013.01); *F16K 31/1221* (2013.01)

(58) Field of Classification Search
CPC . F16K 7/12; F16K 7/123; F16K 7/126; F16K 7/17; F16K 7/20
See application file for complete search history.

(56) References Cited

U.S. PATENT DOCUMENTS

| | | | |
|---|---|---|---|
| 5,413,311 A * | 5/1995 | Arstein | ............... F16K 7/16 251/368 |
| 2001/0028049 A1 | 10/2001 | Mamyo | |
| 2013/0032600 A1* | 2/2013 | Umezaki | ............... F16K 7/14 251/331 |
| 2015/0108386 A1 | 4/2015 | Obara et al. | |
| 2021/0254752 A1* | 8/2021 | Ando | ............... F16K 31/047 |
| 2022/0268365 A1* | 8/2022 | Hirata | ............... C09D 127/18 |

FOREIGN PATENT DOCUMENTS

| | | | |
|---|---|---|---|
| JP | H05296356 A | * | 11/1993 |
| JP | 2001295948 A | | 10/2001 |
| JP | 2004060741 A | | 2/2004 |
| JP | 2008164097 A | * | 7/2008 |
| JP | 2012026476 A | | 2/2010 |

(Continued)

OTHER PUBLICATIONS

JP2012026476A, Translation (Year: 2012).*

(Continued)

*Primary Examiner* — Daphne M Barry
(74) *Attorney, Agent, or Firm* — CANTOR COLBURN LLP

(57) ABSTRACT

A diaphragm includes: a metal thin plate; and a thin film layer formed over an entirety of a surface on one side of the thin plate.

7 Claims, 2 Drawing Sheets

(56) References Cited

FOREIGN PATENT DOCUMENTS

| JP | 2013249868 A | 12/2013 | | |
|---|---|---|---|---|
| JP | 5637396 B2 | * 12/2014 | ............... | B32B 9/04 |
| KR | 1020150018795 A | 2/2015 | | |
| WO | WO-2017163807 A1 | * 9/2017 | ............. | C01B 32/05 |

OTHER PUBLICATIONS

JP2008164097, Translation (Year: 2008).*
JP2004060741A, Translation (Year: 2004).*
WO_2017163807_A1, Translation (Year: 2017).*
JP-5637396-B2, Translation (Year: 2014).*
JPH05296356A, Translation (Year: 1993).*
International Search Report for International Application No. PCT/JP2020/015584; Date of Mailing, Jun. 16, 2020.
CNIPA Notice of First Office Action corresponding to CN Application No. 202080029645.1; Mailing Date, Feb. 17, 2023.
Korean Office Action corresponding to KR Application No. 10-2021-7038134; Mailing Date, Mar. 15, 2023.

* cited by examiner

DIAPHRAGM, VALVE DEVICE, AND METHOD FOR MANUFACTURING DIAPHRAGM

CROSS REFERENCE TO RELATED APPLICATION

This application is a continuation under 35 U.S.C. § 120 of PCT/JP2020/015584, filed Apr. 6, 2020, which is incorporated herein reference and which claimed priority to Japanese Patent Application No. 2019-086334, filed Apr. 26, 2019. The present application likewise claims priority under 35 U. S. C. § 119 to Japanese Application No. 2019-086334, filed Apr. 26, 2019, the entire contents of which is also incorporated herein by reference.

TECHNICAL FIELD

The present disclosure relates to a diaphragm used in a semiconductor manufacturing device or the like, a valve device, and a method for manufacturing the diaphragm.

BACKGROUND

As miniaturization of semiconductors progresses, there is demand for appropriate control of the size of particles entering a process chamber. To prevent particles from entering the process chamber, a diaphragm in which a thin film layer is formed on a substrate has been proposed.

SUMMARY

However, with the diaphragm of Japanese Patent Application Publication No. 2004-60741, the surface roughness of the thin film layer is not taken into account, making it impossible to appropriately control the size of particles entering the process chamber during manufacture of a semiconductor.

Therefore, an object of the present disclosure is to provide a technique with which it is possible to appropriately control the size of particles entering a process chamber during manufacture of a semiconductor.

A diaphragm according to one or more embodiments of the present disclosure includes: a metal thin plate; and a thin film layer formed over an entirety of a surface on one side of the thin plate.

A valve device according to one or more embodiments of the present disclosure includes: a body in which a fluid passage is formed; a valve seat provided in the body; and the above diaphragm which is configured to open and close the fluid passage by abutting the valve seat and separating from the valve seat. The thin film layer of the diaphragm is positioned on the valve seat side.

A method for manufacturing a diaphragm having a metal thin plate and a thin film layer according to one or more embodiments of the present disclosure includes: molding the thin plate into a spherical shell shape; and forming the thin film layer, which has a surface roughness with a maximum height Rmax of less than 0.1 μm, over an entirety of a concave surface of the thin plate.

DESCRIPTION OF THE PREFERRED EMBODIMENTS

A diaphragm 30 and a valve device 1 according to an embodiment of the present disclosure will be described below with reference to the figures.

Figure 1:
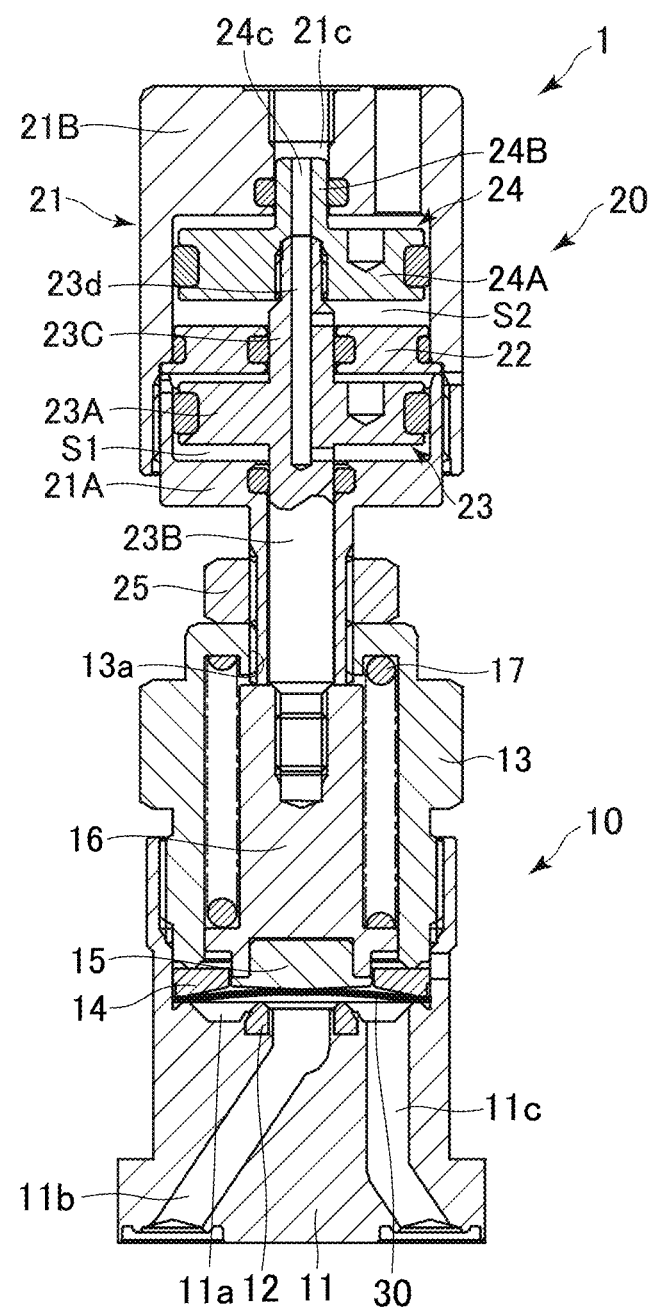
FIG. 1 is a sectional view of a valve device in an open state, according to an embodiment.

FIG. 1 is a sectional view of the valve device 1 in an open state, according to this embodiment.

As shown in FIG. 1, the valve device 1 includes a body 10 and an actuator 20. Note that in the following description, the actuator 20 side and the body 10 side of the valve device 1 will be described as an upper side and a lower side, respectively.

[Body 10]

The body 10 includes a body main body 11, a seat 12 serving as a valve seat, a bonnet 13, the diaphragm 30, a retainer adapter 14, a diaphragm retainer 15, a holder 16, and a compression coil spring 17.

Figure 2:
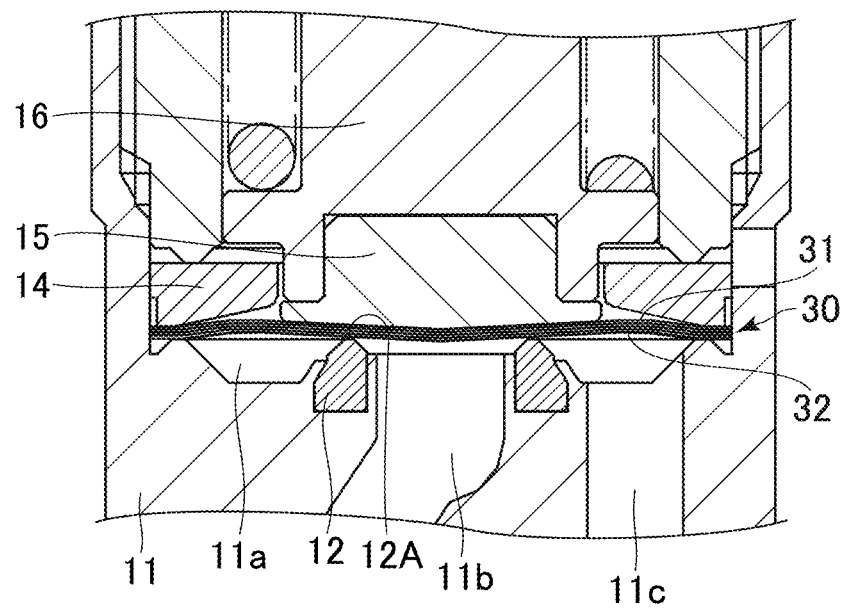
FIG. 2 is an enlarged sectional view of the vicinity of a diaphragm in the valve device in a closed state.

A valve chamber 11a and an inflow passage 11b and an outflow passage 11c that communicate with the valve chamber 11a are formed in the body main body 11. The resin seat 12 is formed in an annular shape and provided in the body main body 11 on the peripheral edge of a location where the valve chamber 11a communicates with the inflow passage 11b. As shown in FIG. 2, a top surface 12A of the seat 12 has a planar shape. The inflow passage 11b and outflow passage 11c correspond to a fluid passage.

As shown in FIG. 1, the bonnet 13 has a substantially cylindrical shape with a lid, and by screwing a lower end portion thereof to the body main body 11, the bonnet 13 is fixed to the body main body 11 so as to cover the valve chamber 11a.

The diaphragm 30, which serves as a valve body, is held by pinching an outer peripheral edge portion thereof between the retainer adapter 14, which is disposed on a lower end of the bonnet 13, and a bottom surface forming the valve chamber 11a of the body main body 11. The fluid passage is opened and closed by causing the diaphragm 30 to separate from and abut (press against) the seat 12. The configuration of the diaphragm 30 will be described in detail below.

The diaphragm retainer 15 is provided on the upper side of the diaphragm 30 and configured to be capable of pressing a central portion of the diaphragm 30. The diaphragm retainer 15 is fitted to the holder 16.

The holder 16 has a substantially columnar shape and is disposed so as to be capable of moving up and down through the bonnet 13. A stem 23B, to be described below, is screwed to an upper portion of the holder 16.

The compression coil spring 17 is provided inside the bonnet 13 so as to bias the bonnet 13 downward at all times. The valve device 1 is normally (i.e., when the actuator 20 is inoperative) held in a closed state by the compression coil spring 17.

[Actuator 20]

The actuator 20 is an air-driven actuator having a substantially columnar overall shape, and includes a casing 21, a partition disc 22, a first piston portion 23, and a second piston portion 24.

The casing 21 includes a lower casing 21A and an upper casing 21B having a lower end portion that is screwed to an upper end portion of the lower casing 21A. The lower casing 21A has a substantially stepped cylindrical shape. An outer periphery of a lower end portion of the lower casing 21A is screwed to the inner periphery of a through hole in the bonnet 13. The upper casing 21B has a substantially cylindrical shape with a lid. A fluid introduction passage 21c is formed in an upper end portion of the upper casing 21B.

A nut 25 is screwed to the outer periphery of the lower end portion of the lower casing 21A. The nut 25 abuts the bonnet 13 so as to suppress rotation of the lower casing 21A relative to the bonnet 13.

The partition disc 22 is substantially disc-shaped and provided immovably inside the casing 21.

The first piston portion 23 includes a first piston 23A, the stem 23B, and a first upper extension portion 23C. The first piston 23A is provided between the partition disc 22 and the lower casing 21A and is substantially disc-shaped. A first pressure chamber S1 is formed by the lower casing 21A and the first piston 23A.

The stem 23B extends downward from a central portion of the first piston 23A. A lower end portion of the stem 23B is screwed to the holder 16. The first upper extension portion 23C extends upward from the central portion of the first piston 23A so as to penetrate the partition disc 22.

A first fluid inflow passage 23d that extends in an up-down direction and communicates with the first pressure chamber S1 and a second pressure chamber S2 is formed in the first piston 23A, the stem 23B, and the first upper extension portion 23C.

The second piston portion 24 includes a second piston 24A and a second upper extension portion 24B. The second piston 24A is provided between the partition disc 22 and the upper casing 21B and is substantially disc-shaped. The second pressure chamber S2 is formed by the partition disc 22 and the second piston 24A. An upper end portion of the first upper extension portion 23C is connected to the second piston 24A.

The second upper extension portion 24B extends upward from a central portion of the second piston 24A, and is inserted into the fluid introduction passage 21c. A second fluid inflow passage 24c that communicates with the fluid introduction passage 21c and the first fluid inflow passage 23d is formed in the second upper extension portion 24B.

[Opening/Closing Operation of Valve Device 1]

Next, an opening/closing operation of the valve device 1 according to this embodiment will be described.

FIG. 2 is an enlarged sectional view of the vicinity of the diaphragm 30 in the valve device 1 in a closed state.

In the valve device 1 according to this embodiment, in a state where no drive fluid flows into the first and second pressure chambers S1 and S2, as shown in FIG. 2, the holder 16 and the stem 23B are held at bottom dead center (close to the body main body 11) by the biasing force of the compression coil spring 17, the diaphragm 30 is retained by the diaphragm retainer 15, and the lower surface of the diaphragm 30 is pressed against the seat 12, whereby the valve device 1 is in a closed state. In other words, in a normal state (a state where no drive fluid is supplied), the valve device 1 is in a closed state.

A state in which drive fluid flows into the valve device 1 from a drive fluid supply source, not shown in the figures, is then established. As a result, drive fluid is supplied to the valve device 1. The drive fluid passes through the fluid introduction passage 21c via an air tube and a pipe joint, not shown in the figures, then passes through the first and second fluid inflow passages 23d and 24c, and then flows into the first and second pressure chambers S1 and S2. When the drive fluid flows into the first and second pressure chambers S1 and S2, the first and second pistons 23A and 24A rise against the biasing force of the compression coil spring 17. Accordingly, the holder 16, the diaphragm retainer 15, and the stem 23B move to top dead center, thereby separating from the body main body 11, and the diaphragm 30 is moved upward by elastic force and the pressure of the fluid (gas), thereby connecting the inflow passage 11b to the outflow passage 11c. As a result, the valve device 1 enters an open state.

To set the valve device 1 in the closed state from the open state, a three-way valve, not shown in the figures, is switched to a flow for discharging the drive fluid to the outside from the actuator 20 (the first and second pressure chambers S1 and S2) of the valve device 1. As a result, the drive fluid in the first and second pressure chambers S1 and S2 is discharged to the outside through the first and second fluid inflow passages 23d and 24c and the fluid introduction passage 21c. Accordingly, the holder 16 and the stem 23B are moved to bottom dead center by the biasing force of the compression coil spring 17, and as a result, the valve device 1 enters the closed state.

[Diaphragm 30]

Next, the configuration of the diaphragm 30 will be described.

The diaphragm 30 takes the shape of a spherical shell having an upwardly convex arc shape in a natural state. The diaphragm 30 includes, for example, a plurality of metal thin plates 31 and a thin film layer 32. Each thin plate 31 is formed from nickel cobalt alloy, stainless steel, or the like, and is formed in a spherical shell shape by cutting out a circle from a flat plate-shaped raw material and causing the central portion thereof to bulge upward.

Figure 3A:
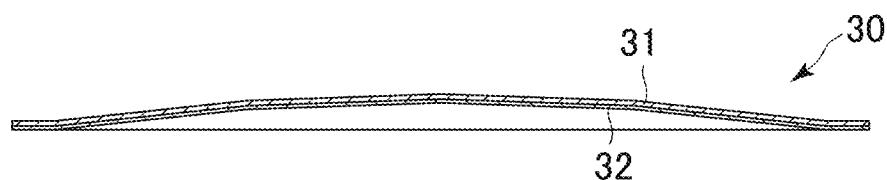
FIG. 3A is a sectional view of a thin plate and a thin film layer positioned furthest toward a seat side.
Figure 3B:
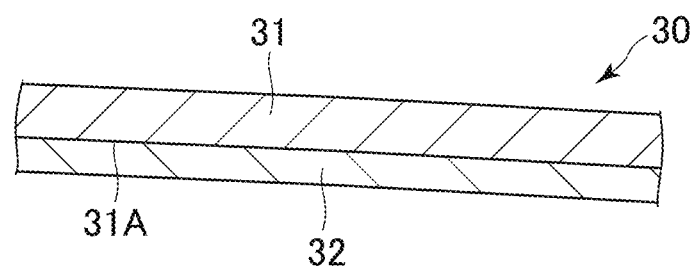
FIG. 3B is a partially enlarged sectional view of the thin plate and the thin film layer of FIG. 3A.

FIG. 3A is a sectional view of the thin plate 31 and the thin film layer 32 positioned furthest toward the seat 12 side, and FIG. 3B is a partially enlarged sectional view of the thin plate 31 and the thin film layer 32 of FIG. 3A.

The thin film layer 32 is formed over the entirety of a liquid contact surface 31A constituted by a concave surface of the thin plate 31. The liquid contact surface 31A corresponds to a surface on one side of the thin plate 31. The thin film layer 32 is a carbon film or a fluorine resin film, for example. The carbon film is a DLC (Diamond like Carbon) film, for example, and the fluorine resin film is formed from polytetrafluoroethylene (PTFE), a tetrafluoroethylene-hexafluoropropylene copolymer (FEP), or a tetrafluoroethylene-perfluoroalkyl vinyl ether copolymer (PFA), for example.

The thin film layer 32 has a film thickness of 2-4 μm and a surface roughness with a maximum height Rmax of less than 0.1 μm. In other words, the maximum height Rmax of the surface roughness of the thin film layer 32 is greater than 0 μm and less than 0.1 μm. The maximum height Rmax of the surface roughness of the thin film layer 32 is preferably less than 0.02 μm and more preferably less than 0.01 μm. Here, the maximum height (Rmax) of the surface roughness of the thin film layer 32 is a "maximum height (Rmax)" as defined by JIS B0601 (2001). Note that the surface roughness of the liquid contact surface 31A of the thin plate 31 is Ra 0.05 μm, for example.

Next, a method for manufacturing the diaphragm 30 will be described.

A plurality of disc-shaped and flat plate-shaped thin plates (the raw material) are prepared, whereupon the thin plates are laminated and then adhered using an adhesive or the like so as to be integrated. The integrated plurality of thin plates are fixed to a jig of a pressing device, and by pressing a central portion thereof using a punch, the thin plates are molded into a spherical shell shape.

Next, the molded plurality of thin plates are fixed to a jig of a film forming device, whereupon the thin film layer 32 is formed on the concave surface of the thin plates 31. When the thin film layer 32 is a DLC film, the thin film layer 32 is formed by physical vapor deposition (PVD) and/or chemical vapor deposition (CVD). For example, the DLC film is formed by a combination of magnetron sputtering and PACVD (plasma assisted CVD). When the thin film layer 32 is a PFA film, the thin film layer 32 is formed using electrostatic coating or film thermocompression bonding. Note that by modifying the film forming conditions, the maximum height Rmax of the surface roughness of the thin film layer 32 can be controlled, and in so doing, the thin film layer 32 having the maximum height Rmax described above can be acquired. Further, with regard to the DLC coating, by using vapor deposition instead of spray coating or dip coating, the concave portion of the surface to be coated (the liquid contact surface 31A of the thin plates 31) can be coated selectively such that the coating surface (of the thin film layer 32) acquired as a result is smoother.

With the valve device 1 having the diaphragm 30 of this embodiment, as described above, the thin film layer 32 has a film thickness of 2-4 μm and a surface roughness with a maximum height Rmax of less than 0.1 μm. During purging, therefore, it is possible to prevent particles with a particle size φ of 0.1 μm or more from collecting and accumulating on the surface of the thin film layer 32. Accordingly, particles with a particle size φ of 0.1 μm or more can be prevented from entering a process chamber during manufacture of a semiconductor. Hence, with the valve device 1 having the diaphragm 30 of this embodiment, the size of the particles entering the process chamber during manufacture of a semiconductor can be controlled appropriately. For example, when a semiconductor with a line width of 100 nm is manufactured using a conventional semiconductor manufacturing device, by using the valve device 1 having the diaphragm 30, particles with a particle size φ of 0.1 μm or more can be prevented from entering the process chamber during the manufacturing process. As a result, the semiconductor yield can be improved in comparison with a case where the conventional semiconductor manufacturing device is used as is.

The maximum height Rmax of the surface roughness of the thin film layer 32 is preferably less than 0.02 μm and more preferably less than 0.01 μm. Hence, in a process for manufacturing a current semiconductor having a line width of 0.02 μm, it is possible to prevent particles with a particle size φ of 0.02 μm or more from entering the process chamber. Further, in a process for manufacturing a next-generation semiconductor having a line width of 0.01 μm, it is possible to prevent particles with a particle size φ of 0.01 μm or more from entering the process chamber.

The thin film layer 32 is a carbon film or a fluorine resin film, and the carbon film is constituted by DLC. Therefore, a diaphragm 30 exhibiting low friction and superior wear resistance and corrosion resistance can be provided, and as a result, transfer of the seat 12 onto the diaphragm 30 can be suppressed.

In the manufacturing method for the diaphragm 30, the thin plates 31 are formed into a spherical shell shape, whereupon the thin film layer 32 having a surface roughness with a maximum height Rmax of less than 0.1 μm is formed over the entire concave surface of the thin plates 31. According to this manufacturing method, molding of the thin plates 31 is not performed after the thin film layer 32 is formed, and therefore the diaphragm 30 having the thin film layer 32 on which the maximum height Rmax of the surface roughness is less than 0.1 μm can be provided reliably.

Note that the present disclosure is not limited to the embodiment described above, and a person skilled in the art could implement various additions, modifications, and so on within the scope of the present disclosure.

The thin plates 31 are provided in a plurality, but a single thin plate 31 may be provided. Further, the top surface 12A of the seat 12 is planar but may be an upwardly convex curved surface (a rounded surface on a radial direction cross-section). The actuator 20 is air-driven but may be electromagnetically driven or driven by a piezoelectric element.

What is claimed is:

1. A diaphragm comprising:
   a metal thin plate; and
   a thin film layer formed over an entirety of a surface on one side of the thin plate,
   wherein a maximum height Rmax of a surface roughness of the thin film layer is less than 0.1 μm so that only particles with a particle size of 0.1 micrometer or less enter a process chamber during manufacture of a semiconductor.

2. The diaphragm according to claim 1, wherein the maximum height Rmax of the surface roughness of the thin film layer is less than 0.02 μm.

3. The diaphragm according to claim 2, wherein the maximum height Rmax of the surface roughness of the thin film layer is less than 0.01 μm.

4. The diaphragm according to claim 1, wherein the thin film layer is a carbon film or a fluorine resin film.

5. The diaphragm according to claim 4, wherein the carbon film is constituted by DLC.

6. A valve device comprising:
   a body in which a fluid passage is formed;
   a valve seat provided in the body; and
   the diaphragm according to claim 1, which is configured to open and close the fluid passage by abutting the valve seat and separating from the valve seat,
   wherein the thin film layer of the diaphragm is positioned on the valve seat side.

7. A method for manufacturing a diaphragm having a metal thin plate and a thin film layer, the method comprising:
   molding the thin plate into a spherical shell shape; and
   forming the thin film layer, which has a surface roughness with a maximum height Rmax of less than 0.1 μm, over an entirety of a concave surface of the thin plate so that only particles with a particle size of 0.1 micrometer or less enter a process chamber during manufacture of a semiconductor.

* * * * *